United States Patent [19]

Preti

[11] Patent Number: 4,858,291

[45] Date of Patent: Aug. 22, 1989

[54] METHOD OF MAKING A PIECE OF FURNITURE

[76] Inventor: Gérard Preti, Larny, Pollionnay (Rhone), France

[21] Appl. No.: 90,957

[22] Filed: Aug. 28, 1987

[30] Foreign Application Priority Data

Aug. 29, 1986 [FR] France ............................. 86 12577

[51] Int. Cl.⁴ .............................................. B68G 7/00
[52] U.S. Cl. ..................................... 29/91.1; 29/91.5; 156/212; 156/245; 156/253; 156/307.7; 264/258; 264/337; 297/457; 297/DIG. 2
[58] Field of Search ............... 29/91, 91.1, 91.4, 91.5, 29/445; 156/212, 245, 253, 307.7; 297/457, DIG. 2; 264/258, 337

[56] References Cited

U.S. PATENT DOCUMENTS

| | | | |
|---|---|---|---|
| 3,967,852 | 7/1976 | Eiselt et al. ................ | 297/455 X |
| 4,385,955 | 5/1983 | Doer Lune et al. ........... | 156/245 |
| 4,695,032 | 9/1987 | Desport ....................... | 249/112 |

Primary Examiner—Timothy V. Eley
Assistant Examiner—F. Chin
Attorney, Agent, or Firm—Herbert Dubno; Andrew Wilford

[57] ABSTRACT

A piece of furniture having an upstanding back or arm rest is made by first temporarily securing wire mesh to a frame, then plastically deforming and shaping the mesh on the frame to form the upstanding rest with a three-dimensional shape, and then applying to the shaped mesh a layer of glass-fiber web, soaking same with a hardenable resin, and curing the resin-soaked web until it hardens. At least one anchor is fixed to the cured resin-soaked web and at least one further layer of glass-fiber web is applied to the cured web, soaked with resin, and hardened until the anchors are securely fixed therein to form a free-form shell. The wire mesh is then stripped from the shell, which is trimmed and otherwise finished, padded, and covered. The covered shell is then secured by the anchors to a rigid base. The padded shell is covered with a fine hide having a thickness of at most about 1 mm. A layer at most 6 mm thick of fine padding is adhered to the inside surface of the hide before it is put over the padded shell.

2 Claims, 2 Drawing Sheets

METHOD OF MAKING A PIECE OF FURNITURE

FIELD OF THE INVENTION

The present invention relates to a method of making a piece of furniture. More particularly this invention concerns the construction of a free-form armchair, couch, or the like having an upward projection like an arm or back rest.

BACKGROUND OF THE INVENTION

Normally a piece of furniture having an upward projection like an arm or back rest is typically constructed by building a normally wooden frame and then securing the necessary springs, padding, and coverings to this frame. Even though the materials applied to the frame do indeed in part mask the shape of the frame, its shape nonetheless largely dictates the general massing of the finished furniture.

The frame itself must be very robust and relatively accurately dimensioned. This is difficult to do for other than a skilled craftsman with wood or metal, and makes it impossible to substantially change the shape of a piece of furniture as it is being built and designed.

OBJECTS OF THE INVENTION

It is therefore an object of the present invention to provide an improved method of making furniture.

Another object is the provision of such a method of making furniture which overcomes the above-given disadvantages, that is which allows the shape of the furniture to be varied greatly while still yielding a robust construction.

A further object is to provide a furniture construction method which effectively allows the designer to sculpt the shape of the finished piece to any desired form.

Yet another object is to provide an improved piece of furniture having an upstanding back or arm rest which is endowed at this arm or back rest with a free-form shape.

SUMMARY OF THE INVENTION

A piece of furniture having an upstanding back or arm rest is made according to this invention by first forming the upstanding rest with a three-dimensional shape from plastically deformable wire mesh and then applying to the mesh successive layers of glass-fiber web and resin and curing same to form a free-form shell. The wire mesh is then stripped from the shell and the shell is then padded and secured to a rigid base.

This makes it possible to impart virtually any desired shape to the upstanding arm or back rest. It can be given a combination of gentle and sharp curves and can conform to warped and/or bent planes in a manner that would be virtually impossible for the standard frame formed of screwed-together wooden elements and panels.

According to another feature of this invention anchors, typically threaded bushings, are imbedded in the shell and the shell is subsequently secured to the base by means of these anchors.

More particularly, the method of this invention comprises the steps of first temporarily securing wire mesh to a frame, then plastically deforming and shaping the mesh on the frame to form the upstanding rest with a three-dimensional shape, and then applying to the shaped mesh a layer of glass-fiber web, soaking same with a hardenable resin, and curing the resin-soaked web until it hardens. At least one anchor is fixed to the cured resin-soaked web and at least one further layer of glass-fiber web is applied to the cured web, soaked with resin, and hardened until the anchors are securely fixed therein to form a free-form shell. The wire mesh is then stripped from the shell, which is trimmed and otherwise finished, padded, and covered. The covered shell is then secured by the anchors to a rigid base.

In accordance with a further feature the padded shell is covered with a fine hide having a thickness of at most about 1 mm. A layer at most 6 mm thick of fine padding is adhered to the inside surface of the hide before it is put over the padded shell.

The piece of furniture according to this invention comprises, therefore, a rigid base forming a seat part, a laminated glass-fiber free-form shell secured to the base and forming an upstanding rest thereon, padding and covering on the shell, and a seat cushion on the base.

DESCRIPTION OF THE DRAWING

The above and other objects, features, and advantages will become more apparent from the following, reference being made to the accompanying drawing in which.

SPECIFIC DESCRIPTION

Figure 1:
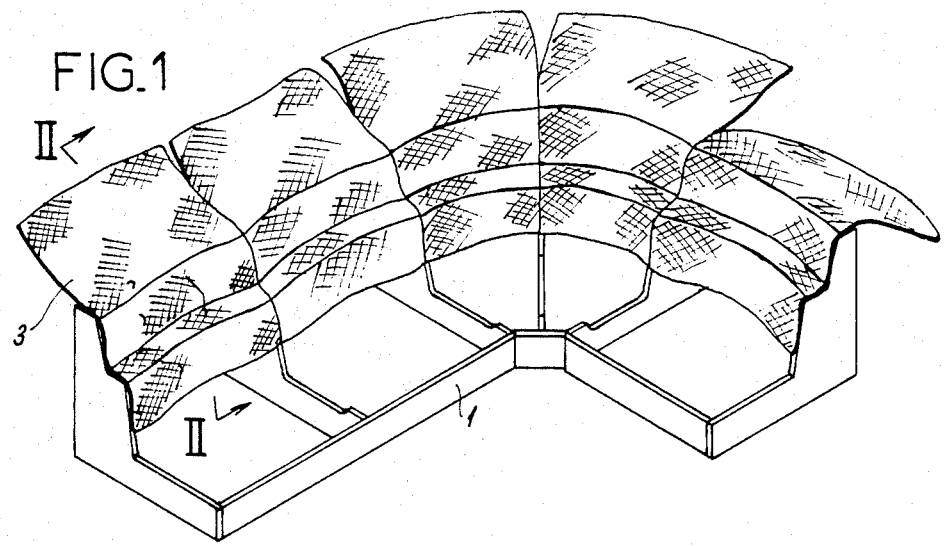
FIG 1 is a perspective view of the first step of making a piece of furniture according to this invention.
Figure 2:
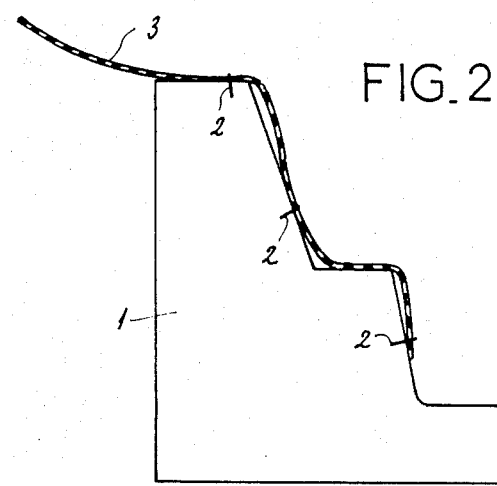
FIG. 2 is a vertical section taken along line II—II of FIG. 1.

As seen in FIGS. 1 and 2 a piece of furniture according to this invention is made by first securing to a simple plywood frame 1 a plurality of sheets of wire mesh 3, normally just chicken-wire fencing having hexagonal openings about 1 cm to 2 cm across, by means of light-duty staples 2. The wire mesh 3 is sufficiently strong and plastically deformable that it can easily be bent into virtually any shape usable in a piece of furniture. As shown here the portions of the back-rest part of the frame 1 are raised and extend up and back on the left-hand end of the L-shaped couch of this invention but down and back on the right-hand end. The mesh 3 can maintain these shapes without support and can even support a modest load when thus bent into shape. It is even possible to patch small pieces of mesh 3 to stapled-down pieces to produce virtually any desired shape.

Figure 3:
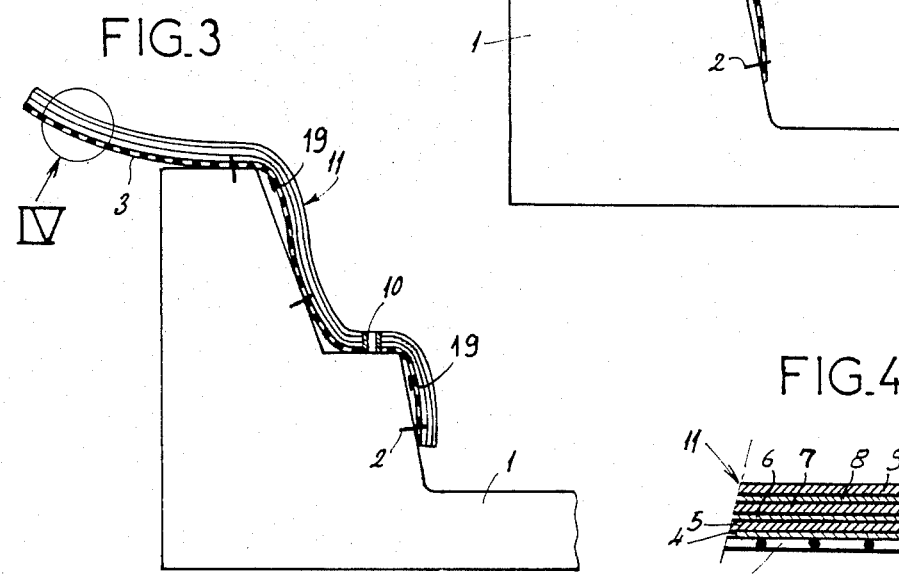
FIG. 3 is a view like FIG. 2 but showing the piece of furniture in a later stage of manufacture.
Figure 4:
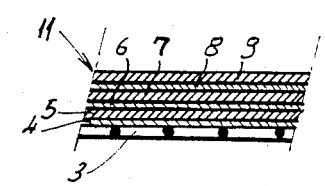
FIG. 4 is a large-scale view of the detail seen in section at IV in FIG. 3.
Figure 5:
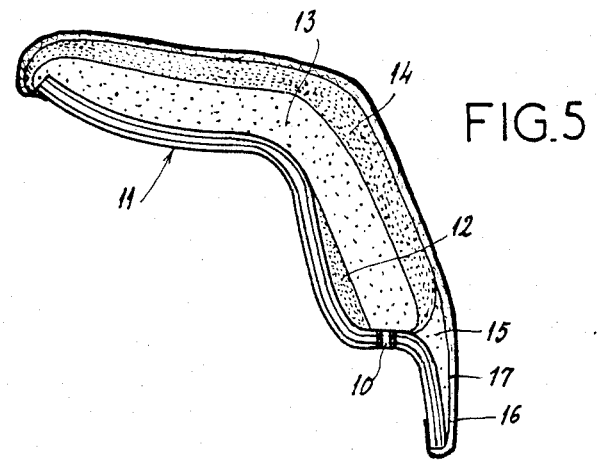
FIG. 5 is a vertical section through a completed furniture element according to the invention.
Figure 6:
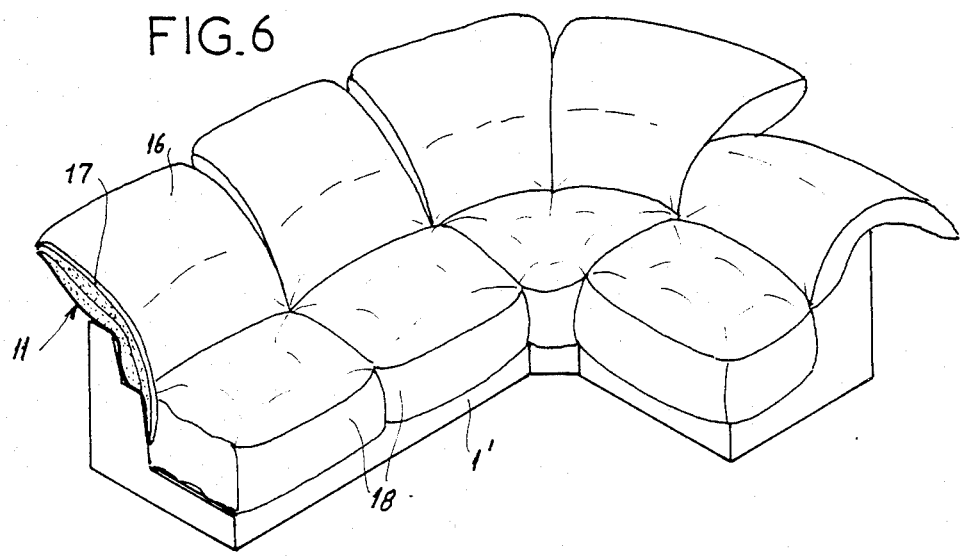
FIG. 6 is a perspective view of the completed piece of furniture in accordance with the current invention.

Then as seen in FIGS. 3 and 4 several gobs 19 of resin are applied to the mesh 3 and a first layer 4 of a glass-fiber web, normally in the form of a loose basket-weave fabric, is adhered to the mesh 3 by means of these gobs 19. The mat 4 is then saturated with a layer 5 of resin which can be brushed, rolled, or sprayed on. The initial layer 4 and its resin 5 are then given several hours to cure and harden.

Once the layers 4 and 5 are hard, another layer 6 of glass-fiber web is applied, and another layer 7 of resin is used to partially saturate it. Then these layers 6 and 7 are allowed to harden, during which process they integrate with the hardened layers 4 and 5 without, however, softening or weakening them substantially during this second curing time. The resultant construction of wire mesh 3 carrying two double layers of glass-fiber web and resin is quite strong.

Threaded insert bushings 10 are then installed in the laminate thus produced. This can be done by drilling holes through it at predetermined spacings and force-fitting them in place. Thereupon another layer of glass-fiber web 8 and resin 9 is applied to the top of the laminate and is allowed to harden. The resultant laminated structure 11 has a thickness of about 6 mm and is extremely strong. At the same time it has the exact free-form shape which was originally imparted to the wire mesh 3.

This laminated structure 11 is then stripped off the frame 1 by simply pulling it therefrom to pull out the staples 2. Then the wire mesh 3 is stripped off the inside of the laminate 11 and it is smoothed and finely shaped with a sander. The finished laminated shell 11 therefore constitutes the frame for the arm and backrests of a piece of free-form sculpted furniture.

Subsequently layers 12, 13, 14, and 15 of standard furniture padding are applied according to the requirements of the design, as for a standard wood-frame structure. The furniture is finished by covering with a fine cow or sheep hide 16 at most 1 mm thick. According to this invention immediately underneath this hide covering 16 a layer 17 about 3 mm thick of synthetic-fiber padding is used, it being applied by an adhesive to the inside of the hide 16 before it is stretched over the padding 12-15. This imparts an extremely fine feel and softness to the furniture.

The padded and covered shell 11 is then secured to a frame 1' generally identical to the frame 1, but normally with a decorative furniture finish, by means of brackets and bolts secured in the threaded bushings 10. Then matching seat cushions 18 are added and the piece of furniture is complete.

I claim:

1. A method of making a piece of furniture having an upstanding back or arm rest, the method comprising the steps of sequentially:
   (a) temporarily securing wire mesh to a frame;
   (b) plastically deforming and shaping the mesh on the frame to form the upstanding rest with a three-dimensional shape;
   (c) applying to the shaped mesh a layer of glass-fiber web, soaking same with a hardenable resin, and curing the resin-soaked web until it hardens;
   (d) fixing at least one anchor to the cured resin-soaked web and applying at least one further layer of glass-fiber web to the cured web, soaking it with resin, and hardening the second resin-soaked web until it is hard and the anchors are securely fixed therein to form a free-form shell;
   (e) stripping the wire mesh from the shell;
   (f) trimming and finishing the shell;
   (g) padding the trimmed and finished shell;
   (h) covering the padded shell;
   (i) securing the covered shell to a rigid base by means of the anchors.

2. Furniture-making method defined in claim 1 wherein the padded shell is covered in step (f), with a fine hide having a thickness of at most about 1 mm, the method further comprising the step before step (f) of adhering a layer at most 6 mm thick of fine padding to the inside surface of the hide.

* * * * *